United States Patent
Burnett et al.

(10) Patent No.: US 10,662,094 B2
(45) Date of Patent: May 26, 2020

(54) METHOD AND APPARATUS FOR WATER TREATMENT

(71) Applicant: Burnett Lime Company, Inc., Campobello, SC (US)

(72) Inventors: Dallas H. Burnett, Roswell, GA (US); C. Hugh Burnett, Campobello, SC (US); Wade L. Burnett, Campobello, SC (US); Tom M. Burnett, Campobello, SC (US)

(73) Assignee: Burnett Lime Company, Inc., Campobello, SC (US)

( * ) Notice: Subject to any disclaimer, the term of this patent is extended or adjusted under 35 U.S.C. 154(b) by 0 days.

(21) Appl. No.: 15/663,953

(22) Filed: Jul. 31, 2017

(65) Prior Publication Data

US 2017/0327392 A1 Nov. 16, 2017

Related U.S. Application Data

(62) Division of application No. 14/578,880, filed on Dec. 22, 2014, now Pat. No. 9,751,784, which is a division
(Continued)

(51) Int. Cl.
*B01F 3/08* (2006.01)
*B01F 5/04* (2006.01)
(Continued)

(52) U.S. Cl.
CPC ............ *C02F 1/686* (2013.01); *B01F 3/0853* (2013.01); *B01F 5/0473* (2013.01);
(Continued)

(58) Field of Classification Search
CPC ........ C02F 1/52; C02F 1/5209; C02F 1/5227; C02F 1/5236; C02F 1/5245; C02F 1/529; C02F 1/66; C02F 1/441; C02F 1/686; C02F 2209/06; C02F 2209/07; C02F 2209/11; B01F 3/0853; B01F 5/0473; B01F 5/0478; B01F 7/00466; B01F 7/00633; B01F 7/00908; B01F 2215/0052; Y10T 137/0318; Y10T 137/87652
See application file for complete search history.

(56) References Cited

U.S. PATENT DOCUMENTS

| 954,103 A | 4/1910 | Irey |
| 2,216,374 A | 10/1940 | Martin |

(Continued)

OTHER PUBLICATIONS

PCT International Search Report for PCT/US2010/061018, dated Feb. 18, 2011.
(Continued)

*Primary Examiner* — Lucas A Stelling
(74) *Attorney, Agent, or Firm* — Dority & Manning, P.A.

(57) ABSTRACT

A method and apparatus for the treatment of water and, more particularly, to the mineralization of water in order to improve pH, hardness, turbidity, and/or alkalinity is described. More particularly, a system is provided for the treatment of water that needs additional hardness, alkalinity, and/or pH adjustment while also meeting turbidity requirements. The use of sodium hydroxide and other methods for avoiding turbidity problems can be eliminated and/or minimized.

15 Claims, 3 Drawing Sheets

Related U.S. Application Data of application No. 12/971,566, filed on Dec. 17, 2010, now Pat. No. 8,951,419.

(51) Int. Cl.
*B01F 7/00* (2006.01)
*C02F 1/44* (2006.01)
*C02F 1/66* (2006.01)
*C02F 1/68* (2006.01)

(52) U.S. Cl.
CPC ........ *B01F 5/0478* (2013.01); *B01F 7/00466* (2013.01); *B01F 7/00633* (2013.01); *B01F 7/00908* (2013.01); *C02F 1/441* (2013.01); *C02F 1/66* (2013.01); *B01F 2215/0052* (2013.01); *C02F 2209/06* (2013.01); *C02F 2209/07* (2013.01); *C02F 2209/11* (2013.01); *Y10T 137/0318* (2015.04); *Y10T 137/87652* (2015.04)

(56) References Cited

U.S. PATENT DOCUMENTS

| | | | |
|---|---|---|---|
| 2,712,831 A | 7/1955 | Day | |
| 2,735,642 A | 2/1956 | Norman | |
| 3,030,083 A * | 4/1962 | Stiffler | B01F 7/00475 366/316 |
| 3,034,543 A | 5/1962 | DuBois | |
| 3,048,121 A | 8/1962 | Sheesley | |
| 3,063,470 A | 11/1962 | Forster | |
| 3,095,120 A | 6/1963 | Steiner et al. | |
| 3,145,881 A | 8/1964 | Moore | |
| 3,353,560 A | 11/1967 | McCulloch | |
| 3,451,347 A | 6/1969 | Chimura | |
| 3,536,102 A | 10/1970 | Allewitz | |
| 3,605,815 A | 9/1971 | Forell | |
| 3,766,992 A | 10/1973 | Tiraspolsky et al. | |
| 3,800,984 A | 4/1974 | Phelan | |
| 3,874,417 A | 4/1975 | Clay | |
| 3,951,572 A | 4/1976 | Ray et al. | |
| 3,966,600 A | 6/1976 | Crowley et al. | |
| 4,135,550 A | 1/1979 | Andersson | |
| 4,320,012 A | 3/1982 | Palm | |
| 4,329,090 A | 5/1982 | Teague | |
| 4,440,499 A | 4/1984 | Tomikawa | |
| 4,452,572 A | 6/1984 | Evrard | |
| 4,632,976 A | 12/1986 | Asanuma et al. | |
| 4,675,116 A | 6/1987 | Hoyland | |
| 4,708,745 A | 11/1987 | Schonhausen | |
| 4,784,295 A | 11/1988 | Holmstrand | |
| 4,810,659 A | 3/1989 | Higo | |
| 4,811,758 A | 3/1989 | Piper | |
| 4,824,022 A | 4/1989 | Hillemeier | |
| 4,955,723 A | 9/1990 | Schneider | |
| 4,979,441 A | 12/1990 | Welch et al. | |
| 5,046,855 A | 9/1991 | Allen | |
| 5,277,491 A | 1/1994 | Burnett et al. | |
| 5,391,302 A | 2/1995 | Funahashi | |
| 5,525,224 A | 6/1996 | Funahashi et al. | |
| 5,720,884 A | 2/1998 | Wallace | |
| 5,931,648 A | 8/1999 | Del Canizo | |
| 5,957,759 A | 9/1999 | Cardenas et al. | |
| 6,039,078 A | 3/2000 | Tamari | |
| 6,572,259 B2 | 6/2003 | Burnett et al. | |
| 2004/0238455 A1 * | 12/2004 | Leino | C02F 1/66 210/743 |
| 2010/0258506 A1 | 10/2010 | Berkowitz et al. | |

OTHER PUBLICATIONS

Pennwalt, Joseph L. Beals, "Mechanics of Handling Lime Slurries", pp. 1-19, Oct. 1973.
Porta Batchtm, "A Time-Tested Portable Lime Slaking System", at least as of Sep. 1982.
Pulsafeeder, "Pulsa Series-Diaphragm Metering Pumps", at least as of Jun. 2007.
Giorgio Migliorini and Renzo Meinardi, "40 MIGD Potabilization Plant at Ras Laffan: Design and Operating Experience" Elsevier Desalination 182, pp. 275-282, at least as of Feb. 21, 2005.
Seacord, Singley, Juby, Voutchkov, "Post-Treatment Concepts for Seawater and Brackish Water Desalting", American Water Works Association Membrane Technology Conference, at least as of 2003.
Robert A. Bergman, Joseph R. Elarde, "Post-Treatment of Reverse Osmosis and Nanofiltration Systems for Municipal Water Supply", American Water Works Association Membrane Technology Conference, at least as of 2005.
Vincent Hart, "Alkalinity Addition Utilizing Carbon Dioxide and Lime: Inexpensive Solution to a Historically Expensive Problem", pp. 17-19, Apr. 2008.
Steven J. Duranceau, "Desalination Post-Treatment Considerations", Florida Water Resources Journal, pp. 2, 4, 6, 8, 10, 12, 14, 16, 18, 19; Nov. 2009.

* cited by examiner

METHOD AND APPARATUS FOR WATER TREATMENT

PRIORITY CLAIM

The present application is a divisional application that claims priority to U.S. application Ser. No. 14/578,880 filed Dec. 22, 2014 and U.S. application Ser. No. 12/971,566 filed on Dec. 17, 2010.

FIELD OF THE INVENTION

The present invention relates to a method and apparatus for the treatment of water and, more particularly, to the mineralization of water in order to improve pH, hardness, turbidity, and/or alkalinity.

BACKGROUND OF THE INVENTION

Conventional processes used in the creation and treatment of potable water vary depending upon the properties of the original, raw water source used as a supply. Whether from rivers, wells, aquifers, saltwater, natural or man-made reservoirs, the properties of the raw water supply can vary substantially based on geography even within short distances. Due to presence of e.g., both manmade and naturally occurring substances found in the earth at or near the raw water source and variations in such substances between different locations, substantially different processes may be required for water treatment.

By way of example, conventional treatment of surface water can include the application of various chemicals to achieve neutralization of harmful organisms and the coagulation or flocculation of undesired components that are then removed by filtration of the same. After filtration, the water may be potable but still have unacceptable values for pH, turbidity, hardness, and/or alkalinity. Thus, treatment before or after filtration may be required to affect these properties.

Even where raw water is provided from underground sources that are already potable, it may still have unacceptable values of pH, turbidity, hardness, and/or alkalinity. For example, water from underground aquifers typically has an unacceptable level of hardness. As such, further treatment for hardness is required to remove excessive amounts of minerals that will otherwise leave scale or undesirable deposits in piping and equipment. Treatment may also be required to obtain acceptable values for pH, turbidity, and/or alkalinity.

Another difficulty encountered with conventional water treatment processes is that steps required to positively treat one property can adversely affect other properties. For example, a current method for the treatment of water hardness in potable water includes large-scale, reverse osmosis (RO) systems. Reverse osmosis is a type of filtration that can remove undesired molecules and ions, along with other particulates, from water. Typically, water that is placed on one side of a membrane and by the application of pressure, water will move through the membrane leaving the undesired solutes and other particulates on the pressured side. The membranes used for reverse osmosis are selective in that such will not allow certain larger molecules and ions to pass through—thereby removing the same from the water.

Reverse osmosis is frequently used in the creation of potable water from seawater or saltwater. Removing the salt and other substances from the water is a necessary step in the creation of water suitable not only for human consumption but also for industrial applications where saltwater would foul pipes and otherwise introduce undesirable components. Depending upon the geographical location of a population center, saltwater may be the only practical source of water available in the quantities needed.

Unfortunately, the effectiveness of reverse osmosis actually creates a water quality problem. More specifically, in the removal of undesirable salts and other particulates, all or most dissolved minerals are also removed, some of which have desirable properties for potable water. For example, reverse osmosis can effectively remove mineral salts and other particulates from salt water to provide a water having an acceptable turbidity. However, the resulting water can also have unacceptably low values of pH, alkalinity, and hardness.

In order to improve pH, alkalinity, and hardness of the water from raw water sources or from treatment processes such as reverse osmosis that remove desirable minerals, various chemicals can be added in order to mineralize the water. One approach includes the addition of sodium hydroxide in order to adjust the pH. However, adding additional sodium can be counterproductive as it can adversely affect the taste of the water and contradicts certain recommendations of the World Health Organization. Also, the addition of sodium hydroxide does not improve alkalinity or hardness. Soda ash (sodium carbonate) can be used to raise pH and can improve alkalinity, but such does not improve the hardness of the de-mineralized water.

Another option to treat the de-mineralized water includes blending it with mineralized water provided from e.g., a non-membrane, water treatment process. By blending the two, the overall mineral content and pH of the de-mineralized water can be brought to acceptable ranges for potable water. Yet, this approach may not be economically feasible if, for example, the non-membrane water plant (mineralized water) is at great distances from the reverse osmosis water plant (de-mineralized water) or mineralized water is otherwise unavailable.

The addition of slaked lime (i.e. $Ca(OH)_2$) to de-mineralized water can effectively raise pH, improve alkalinity, and add needed hardness to the water. Unfortunately, however, the solubility of slaked lime in water is very low at about 1 part per 1000 parts water and the time to reach complete saturation can occur very slowly. Thus, when lime is used to adjust pH, alkalinity, and hardness to the desired levels, turbidity is frequently increased to an unacceptable value. For example, a typical requirement is that potable water from e.g., reverse osmosis treatment must have less than 1 NTU of turbidity. The addition of slaked lime in quantities sufficient to positively affect pH, alkalinity, and hardness typically will typically also cause an unacceptable increase in turbidity to values of 2 or 3 NTU or higher.

Accordingly, a system that can effectively provide for the treatment of water would be useful. More particularly, a system that can provide for the treatment of water in order to improve pH, hardness, and alkalinity without raising the turbidity of the water above unacceptable levels would be very beneficial. Such a system that can operate e.g., with minimal or no blending and without adding sodium or other undesirable chemicals to the water would be also be desirable and useful.

SUMMARY OF THE INVENTION

Aspects and advantages of the invention will be set forth in part in the following description, or may be obvious from the description, or may be learned through practice of the invention.

In one exemplary aspect of the present invention, a method for water treatment is provided that includes providing a water supply for treatment; adding carbonic acid into the water supply; allowing at least part of the carbonic acid to lower the pH of the water supply; adding calcium hydroxide to the water supply after the step of allowing at least part of the carbonic acid to lower the pH of the water supply; and mixing the water supply using a means for providing mechanical agitation to the flow of water.

The step of adding carbonic acid can include placing carbon dioxide into water that is fed into the water supply. The allowing step can include providing a sufficient length of time between the step of adding carbonic acid and the step of adding calcium hydroxide such that at least part of the carbonic acid has time to lower the pH of the water supply. The allowing step can include providing a sufficient length of travel between the step of adding carbonic acid and the step of adding calcium hydroxide such that at least part of the carbonic acid has lowered the pH of the water supply before the step of adding calcium hydroxide.

The step of adding calcium hydroxide can include preparing a slurry from calcium hydroxide and water; and feeding the slurry into the water supply after the step of adding carbonic acid to the water supply.

The pH of the water after the step of allowing can be in the range of about 2 to about 6. Alternatively, the pH of the water after the step of allowing can be in the range of about 3 to about 5. After the step of mixing, the water can have a turbidity of about 1.0 NTU or less, an alkalinity in the range of about 10 ppm to about 80 ppm, a hardness in the range of about 10 ppm to about 80 ppm, and/or a pH in the range of about 6.5 to about 9.5. Alternatively, the pH of the water after the mixing step can be in the range of about 7 to about 9.5.

The step of providing a water supply for treatment can include filtering the water supply using a membrane. The step of providing a water supply for treatment can include filtering the water using reverse osmosis.

The step of mixing with the mechanical agitation means can include creating a flow path for the water after the step of adding calcium hydroxide, positioning an impeller within the flow path, and rotating the impeller. The rotating step can include rotating the impeller in the range of about 300 rpm to about 5000 rpm and/or obtaining a G-value of about 5000 or greater. The impeller can be mounted on a shaft and have a plurality of edges that are substantially parallel to the shaft.

In another exemplary aspect, the present invention can include the steps of providing water for treatment; lowering the pH of the water; increasing the pH, hardness, alkalinity, and turbidity of the water after the step of lowering the pH; decreasing the turbidity of the water by mechanical agitation after the step of increasing, the decreasing step occurring without significantly affecting the pH, hardness, or alkalinity of the water.

In still another exemplary embodiment, the present invention can include a system for water treatment. The system includes a first channel providing a flow of water; a second channel that transversely intersects the first channel and provides a flow of carbonic acid into the flow of water of the first channel; a third transversely intersecting the first channel to provide a flow of calcium hydroxide into the flow of water provided by the first channel. The second channel intersects downstream of the intersection of the second channel and the first channel. A means for providing mechanical agitation is positioned downstream of the intersection of the third channel and the first channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present invention relates to a method and apparatus for the treatment of water and, more particularly, to the mineralization of water in order to improve pH, hardness, turbidity, and/or alkalinity. More particularly, the present invention provides for the treatment of water that needs additional hardness, alkalinity, and/or pH adjustment while also meeting turbidity requirements. The use of sodium hydroxide to address turbidity problems can be avoided. The blending of water from an underground or previously treated source can be minimized or avoided.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

As used herein, the following definitions apply:

"Alkalinity" refers to the buffering capacity of water and, more particularly, to the ability of water to neutralize acid and bases and thereby maintain a fairly stable pH.

"Hardness" refers to the amount of multivalent cations in water—typically metals such as $Mg^{2+}$ and $Ca^{2+}$.

"Turbidity" refers to the cloudiness or haziness water caused by the presence of suspended particles in the water. Turbidity can be reported in nephelometric turbidity units of NTU. By way of example, certain drinking water applications require an NTU of less than 1.0.

Figure 1:
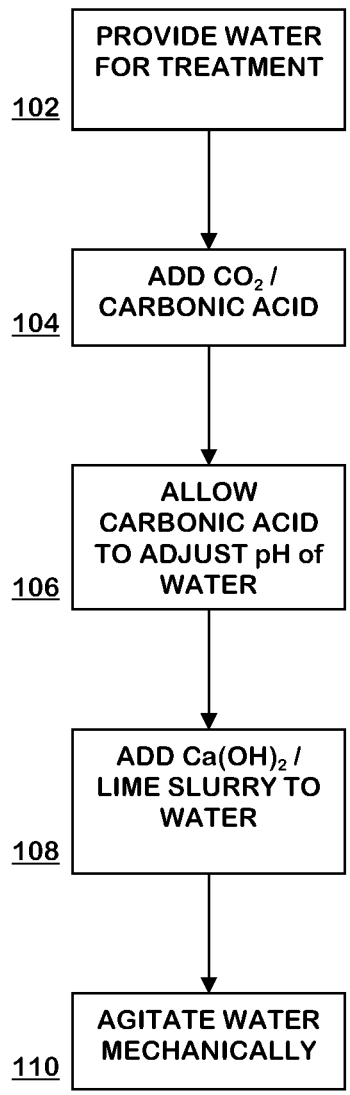
FIG. 1 provides a flow chart of steps according to an exemplary method of the present invention.

FIG. 1 provides a flow chart illustrating an exemplary method of the present invention. In step 102, water is provided that needs treatment. More specifically, water is provided that needs hardness e.g., the addition of multivalent cations such as $Mg^{2+}$ and $Ca^{2+}$. The water may also need pH, turbidity, and alkalinity adjustment.

By way of example, the water provided for treatment may comprise the permeate from membrane treatment such as e.g., RO filtered water. Such water typically will have an acceptable turbidity level but an unacceptably low level of hardness. For some RO permeates, the water may also have an unacceptable low pH due to the addition of acid(s) for treatment of the membrane. However, water that needs treatment may also come from other sources as well including e.g., surface water sources, underground water sources, or from other water treatment systems that have left the water at unacceptable levels of hardness.

In step 104, the pH of the water is lowered by the addition of carbon dioxide or carbonic acid to the water. Carbonic acid ($H_2CO_3$) is formed from the addition of carbon dioxide into the water. More particularly, when dissolved in water, carbon dioxide will exist in equilibrium with carbonic acid according to the following equation:

$$CO_2 + H_2O \rightleftharpoons H_2CO_3$$

Devices exist for the creation of carbonic acid in this manner. For example, such a device is sold by GrayTech Carbonic, Inc. of Union Star, Mo.

After carbonic acid is added to the water, in step 106, time is allowed for the lowering of the pH by such addition. For example, if the water being treated is provided as a flow in a pipe or other channel, sufficient distance is allowed for the water to properly lower the pH before step 108 is conducted. Preferably, the pH is lowered to a value in the range of about 2 to about 6. Still more preferably, the pH of the water is lowered to a value in the range of about 3 to about 5.

After the pH has been adjusted, slaked lime or $Ca(OH)_2$ is added to the water. Preferably, this step is conducted by the addition of lime slurry—i.e. slaked lime that has already been placed into water before the addition to the water that is being treated. The addition of $Ca(OH)_2$ "mineralizes" the water to raise both hardness and alkalinity. For example, the slaked lime will react with carbonic acid in the water as follows:

$$H_2CO_3 Ca(OH)_2 \rightleftharpoons CaCO_3 + 2H_2O$$

Additionally, to the extent carbon dioxide is present in the water, the slaked lime with react with the same as follows:

$$Ca(OH)_2 + CO_2 \rightarrow CaCO_3 + H_2O$$

By either of the above reactions, the soluble calcium carbonate ($CaCO_3$) is provided into the water. This in turn provides the needed increase in both hardness and alkalinity in that the multivalent cation $Ca^{2+}$ is provided along with $CO_3^{2-}$. In addition, calcium carbonate can also react with water and carbon dioxide in the water to form the soluble calcium bicarbonate as follows:

$$CaCO_3 CO_2 + H_2O \rightarrow Ca(HCO_3)_2$$

Again, this operates to improve both hardness and alkalinity by providing $Ca^{2+}$ into the water along with $HCO_3^{1-}$. Preferably, slaked lime is added in step 108 until the alkalinity and hardness are in a range of about 10 ppm to about 80 ppm (parts per million). While it is preferably to add the lime as a slurry into the water, slaked lime may be added directly into the water as well.

Unfortunately, the addition of $Ca(OH)2$ to the water (whether in a slurry or as a solid) will also increase the water's turbidity to a level that is likely unacceptable. For example, the turbidity can be increased to a level above 1—NTU which is not acceptable in certain applications. Accordingly, in order to improve the turbidity, a means for mechanical agitation is provided to the water in step 110. As used herein, mechanical agitation refers to mixing using an impeller or other device that is rotated or moved through the water so as to shear the water, preferably at a high rate of shear.

Figure 2:
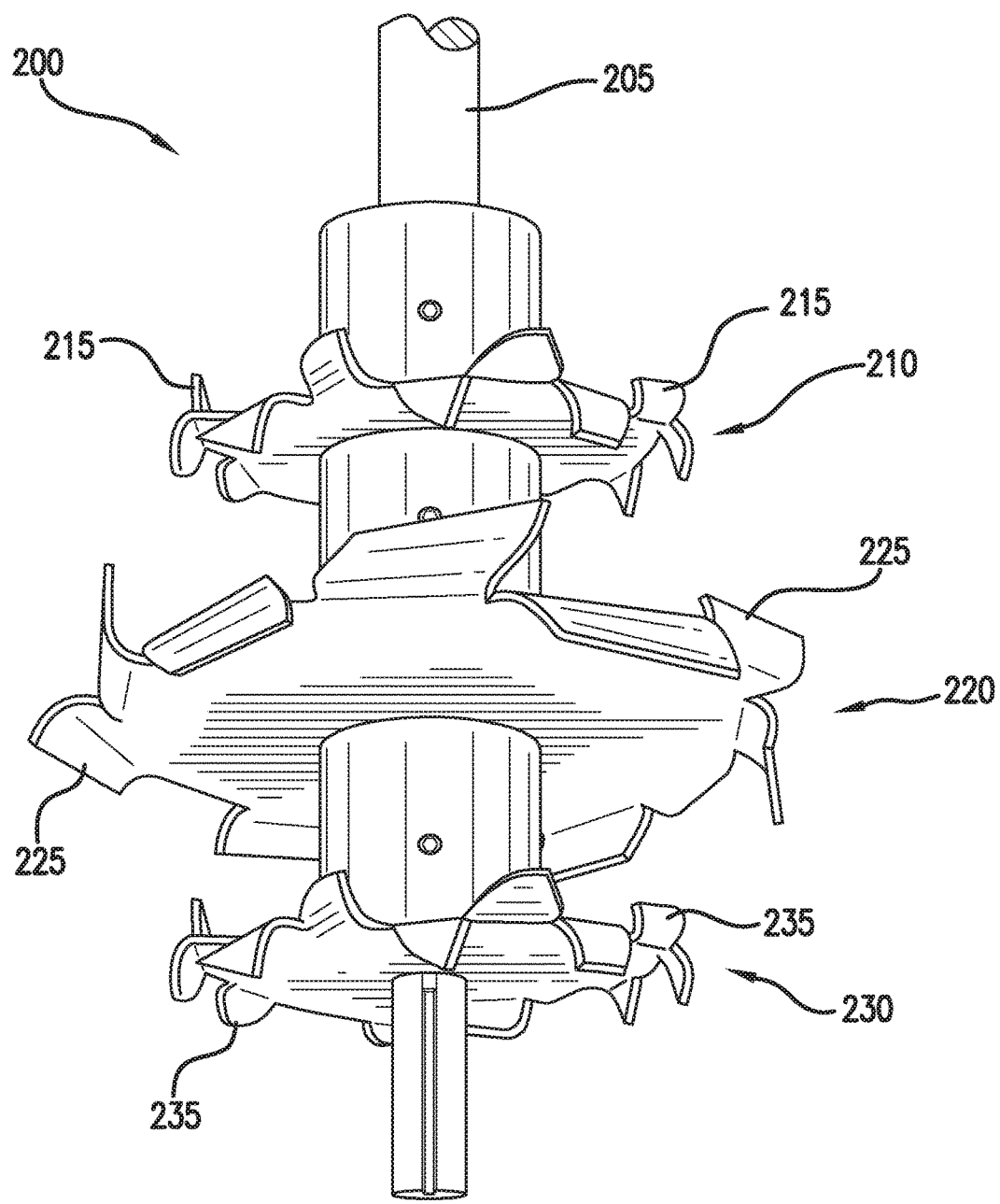
FIG. 2 provides a perspective view of an exemplary embodiment of a rotor as may be used to provide mechanical agitation according to the present invention.

FIG. 2 provides an exemplary embodiment of an impeller 200 as may be used with the present invention as the means for providing mechanical agitation. As shown, impeller 200 includes disk 210, disk 220, and disk 230 mounted onto shaft 205. Disk 210 includes a plurality of blades 215, disk 220 includes a plurality of blades 225, and disk 230 includes a plurality of blades 235. Blades 215, 225, and 235 are oriented out of the plane of their respective disk and alternate between e.g., a turn up and a turn down. As such, during operation, blades 215, 225, and 235 provide multiple edges for the shearing of the water as shaft 205 is rotated. Impeller 200 is provided, for example, by INDCO of New Albany, Ind. While not intended to be bound by any particular theory, it is believed that the shear provided by the plurality of blades 215, 225, and 235 provides for increased shearing and/or increased collisions with particles in the water so as to assist in reducing the turbidity. Impeller 200 is provided by way of example only. Using the teachings disclosed herein, it will be understood that other configurations and designs for impeller 200 may be used as well to provide mechanical agitation of the water in step 110.

Figure 3:
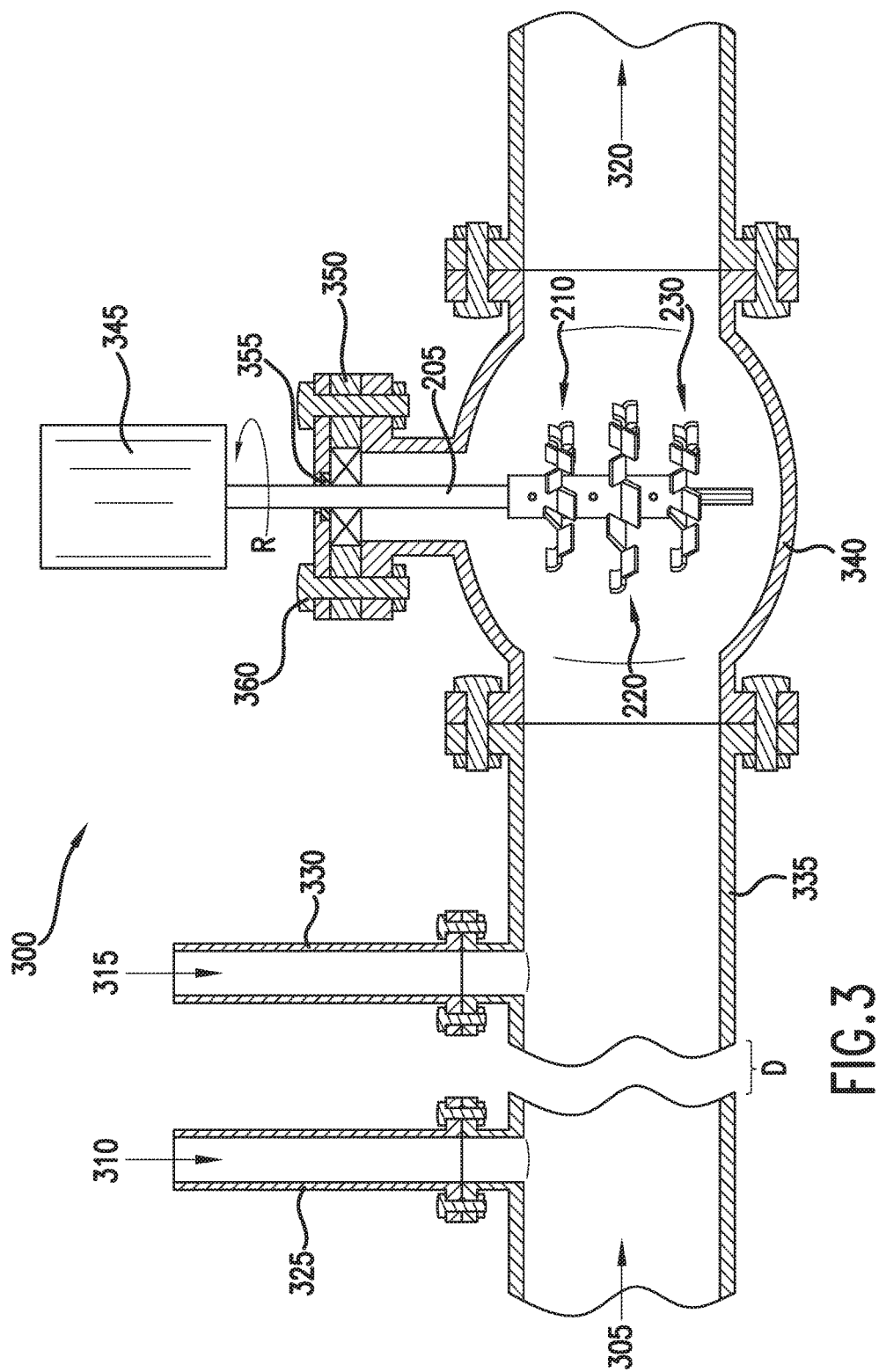
FIG. 3 provides a perspective view of an exemplary embodiment of an apparatus for water treatment according to the present invention.

FIG. 3 shows an apparatus 300 for water treatment that incorporates impeller 200 according to an exemplary embodiment of the present invention. Through a first channel 335 defined by a first channel wall, a flow of water 305 in need of treatment—i.e., having a hardness that is too low is provided. A second channel 325 defined by a second channel wall transversely intersects first channel 335 and provides a flow 310 of carbonic acid or carbon dioxide gas into water 305. A third channel 330 defined by a third channel wall also transversely intersects first channel 335 and provide a flow 315 of calcium hydroxide (in the form a slake lime slurry) into the flow of water 305 in first channel 335.

Distance D represents a predetermined distance by which the intersection of third channel 330 is positioned downstream of the intersection of second channel 325 with first channel 335. This distance provides enough time for the carbonic acid to lower the pH of the water flow 305 before the addition of calcium hydroxide. This amount will vary with application but is typically in the range of 10 to 80 feet. Other distances may be used as well.

As flow 305 continues downstream, it encounters impeller 200 within a tee 340. Impeller 200 is driven by a motor 345. Shaft 205 extends through a bearing 355 mounted in a flange 350, which is secured to tee 340 using bolts 360. In some embodiments, shaft 205 may extend down to the bottom of tee 340 where it may be received by a bearing or other device configured for receipt of the end of shaft 205 to provide additional stability.

A range of speeds for the rotation R of impeller 200 may be used. For example, a range of 300 rpm to about 5000 rpm is used. Alternatively, a range of 1000 to 2000 rpm may be used. The precise speed of rotation will depend upon a variety of factors including the design of impeller 200, the flow rate of water being agitated, the geometry of the channel or other device in which impeller 200 is placed, and other factors as well. These variables can be adjusted such that using mechanical agitation, the turbidity of the water 320 exiting device 300 can be reduced to an acceptable NTU value in step 110. For example, NTU can be reduced to a value of 1.0 or lower.

Apparatus 300 is provided by way of example only. As will be understood by one of ordinary skill in the art using the teachings disclosed herein, other devices may be configured as well to provide water treatment according to the present invention. Preferably, apparatus 300 is positioned downstream of a filtering process such as e.g., an RO filtering process. However, for some applications, apparatus 300 or other devices for water treatment according to the present invention may be positioned upstream of the filtering process as well.

As stated above, apparatus 300 uses mechanical agitation to provide shear mixing and lower the turbidity of the water being treated. One approach to understanding shear mixing is a measurement that relates to how much power is transferred into mechanical agitation. For example, one such measurement is referred to as the root mean velocity gradient or "G-value." Proposed by Camp and Stein (1943), "G-value" refers to mechanical power to facilitate turbulent mixing and depends upon power, volume (i.e. the amount mixed or the container size where mixing occurs), and the viscosity of water ($\mu$). The viscosity of water is a variable factor that is dependent upon water temperature, which can vary widely from seasonal changes or the location of the water plant.

G-value can be calculated as follows:

$$G = \sqrt{\frac{P}{\mu V}}$$

where:
G=velocity gradient (sec$^{-1}$)
P=Power or energy imparted to water (hp×550) lb-ft
$\mu$=Dynamic viscosity of water (50° F.)
   (50° F.) 2.730×10$^{-5}$ lb/ft$^2$
   (60° F.) 2.344×10$^{-5}$ lb/ft$^2$
   (70° F.) 2.034×10$^{-5}$ lb/ft$^2$
   (80° F.) 1.791×10$^{-5}$ lb/ft$^2$
V=Liquid Volume m$^3$ or ft$^3$ For example, consider two colloidal particles, 0.05 ft apart, moving in a vessel. Each particle is moving at a velocity of 4 ft/sec relative to each other.

$$G = \frac{4 \text{ ft/sec}}{.05 \text{ ft}} = \frac{80 \text{ ft/sec}}{\text{ft}} = 80\frac{1}{\text{sec}} = 80 \text{ sec}^{-1}$$

The greater the G-value, the faster the particles will collide. In a water treatment plant, for example, a flash mix basin can have G-values of 1000-5000 sec$^{-1}$, while the slower mixing flocculation basins will have G-values of 20-100 sec$^{-1}$.

In order to obtain the desired reduction in turbidity using apparatus 300, a G-value of about 5000 or greater is preferred although other values may be used depending upon the application and the processing time available. By way of example, using an impeller similar to impeller 200, with a 5 inch diameter blade 225, in a tee 340 connected to an 8 inch diameter pipe for first channel 335, a G-value of 11771.2 sec$^{-1}$ can be obtained with a 1 hp motor. Such configuration and G-value were applied experimentally and found to be effective at e.g., lowering the turbidity of RO permeate to an acceptable NTU when previously treated with carbonic acid and slaked lime as described above.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for water treatment of a continuous flow of water through said system, comprising:
   a continuous first channel providing a continuous flow of water;
   a second channel that transversely intersects said first channel and provides a single flow location of carbonic acid into the flow of water of said first channel at the transverse intersection between said first channel and said second channel;
   a third channel transversely intersecting said first channel to provide a flow of calcium hydroxide into the flow of water provided by said first channel, said third channel intersecting downstream of the transverse intersection of said second channel and said first channel such that the flow of calcium hydroxide into the continuous flow of water is spaced from the transverse intersection between said first channel and said second channel;
   wherein the second channel and third channel are separated along the first channel by a predetermined continuous distance of the first channel, the predetermined distance sufficient for the carbonic acid introduced into the first channel to mix and lower pH of the flow of water between the second channel and the third channel to a desired pH value before the addition of the calcium hydroxide; and
   means for providing mechanical agitation to the continuos flow of water in the first channel to decrease turbidity of the water, the mechanical agitation means positioned downstream of the intersection of said third channel and said first channel.

2. The system for water treatment as in claim 1, wherein the predetermined distance is in the range of 10 to 80 feet.

3. The system for water treatment as in claim 1, wherein the mechanical agitation means is configured to shear the water flowing through the first channel at a rate sufficient to tower the turbidity.

4. The system for water treatment as in claim 3, wherein the mechanical agitation means comprises an impeller disposed in a flow path of the water flowing through the first channel.

5. The system for water treatment as in claim 4, wherein the impeller is rotated at a speed in the range of 300 rpm to 5000 rpm.

6. The system for water treatment as in claim 4, wherein the impeller comprises a disk defining a plane and a plurality of blades carried by the disk and oriented out of the plane.

7. The system for water treatment as in claim 1, wherein the flow of calcium hydroxide comprises calcium hydroxide and water.

8. A system for treatment of a continuous flow of potable water, comprising:
   a first channel defined by a first channel wall, the first channel disposed in the system to provide a continuous flow of water through the system;

a second channel defined by a second channel wall that transversely intersects the first channel wall, the second channel in communication with a source of carbonic acid such that the carbonic acid is introduced into the continuous flow of water in the first channel;

a third channel defined by a third channel wall that transversely intersects the first channel wall downstream of the second channel wall, the third channel in communication with a source of calcium hydroxide such that the calcium hydroxide is introduced into the continuous flow of water in the first channel subsequent to introduction of the carbonic acid from the second channel such that the flow of calcium hydroxide into the flow of water is separate and spaced from the transverse intersection between the first channel wall and the second channel wall; and the third channel spaced at a distance from the second channel along the first channel sufficient for the carbonic acid to mix with and lower pH of the water as a result of continuous flow of the water in the first channel between the transverse intersection of the second channel wall and the first channel wall and the transverse intersection of the third channel wall and the first channel wall and prior to introduction of the calcium hydroxide from the third channel.

9. The system for potable water treatment as in claim 8, wherein the distance is in the range of 10 to 80 feet.

10. The system for potable water treatment as in claim 8, wherein the first channel wall is continuous and uninterrupted between the second channel and the third channel.

11. The system for potable water treatment as in claim 8, wherein turbidity of the continuous flow of water is reduced at a location in the system downstream from the third channel, the first channel defining a flow path configured to sustain the continuous flow of water at the location as the turbidity is reduced.

12. The system for potable water treatment as in claim 11, further comprising an agitator disposed within the first channel at the location downstream from the third channel, the agitator configured to induce turbulent mixing in the continuous flow of water to reduce the turbidity.

13. The system for potable water treatment as in claim 12, wherein the agitator comprises a device that shears the water to induce the turbulent mixing.

14. The system for potable water treatment as in claim 13, wherein the device comprises a driven member.

15. The system for potable water treatment as in claim 14, wherein the driven member comprises a rotationally driven impeller.

* * * * *